(12) United States Patent
Jaakkola et al.

(10) Patent No.: US 6,274,817 B1
(45) Date of Patent: Aug. 14, 2001

(54) ARRANGEMENT IN CONDUCTOR TRACK

(75) Inventors: Risto Jaakkola; Eero Nieminen, both of Espoo; Maria Wiren-Gottberg, Nordanå; Stig Winsten, Espoo; Esko Väisänen, Klaukkala, all of (FI)

(73) Assignee: Nordic Aluminium Oy, Kirkkonummi (FI)

( * ) Notice: Subject to any disclaimer, the term of this patent is extended or adjusted under 35 U.S.C. 154(b) by 0 days.

(21) Appl. No.: 09/549,702

(22) Filed: Apr. 14, 2000

(30) Foreign Application Priority Data

Apr. 15, 1999 (FI) ........................................................ 990842

(51) Int. Cl.⁷ ..................................................... H02G 3/28
(52) U.S. Cl. ........................ 174/96; 174/68.1; 174/99 R; 52/220.3; 248/68.1; 439/110
(58) Field of Search .................................. 174/68.1, 68.3, 174/72 A, 96, 97, 99 B, 99 R, 48, 49; 52/220.3; 248/49, 68.1; 439/110, 111

(56) References Cited

U.S. PATENT DOCUMENTS

| | | | |
|---|---|---|---|
| 4,121,879 | * 10/1978 | Olsen | 339/14 R |
| 4,776,809 | * 10/1988 | Hall | 439/116 |
| 4,919,625 | * 4/1990 | Coutre | 439/118 |
| 5,869,786 | 2/1999 | Jaakkola et al. | 174/96 |
| 6,033,097 | * 3/2000 | Harwood | 362/404 |
| 6,059,582 | * 5/2000 | Tsai | 439/121 |
| 6,079,992 | * 6/2000 | Kuchar et al. | 439/122 |

* cited by examiner

*Primary Examiner*—Anthony Dinkins
*Assistant Examiner*—Adolfo Nino
(74) *Attorney, Agent, or Firm*—Sughrue, Mion, Zinn Macpeak & Seas, PLLC

(57) ABSTRACT

An arrangement in a conductor track, the conductor track having a connection groove extending in the longitudinal direction of the track for connecting devices to the conductor track by way of an adapter, current conductors arranged in the connection groove in the longitudinal direction thereof for supplying power by way of the adapter to the devices connected to the conductor track, and at least one signal conductor arranged in the conductor track for supplying by way of the adapter a control signal, such as a bus control signal, to the device connected to the conductor track. To achieve a simple and esthetically advantageous solution, at least one signal conductor is arranged in the connection groove of the conductor track, and a partition wall of electrically conductive material is arranged between the signal conductor and the current conductor.

18 Claims, 3 Drawing Sheets

ARRANGEMENT IN CONDUCTOR TRACK

BACKGROUND OF THE INVENTION AND DESCRIPTION OF THE RELATED ART

The invention relates to an arrangement in a conductor track, said conductor track comprising a connection groove extending in the longitudinal direction of the track for connecting devices to the conductor track by means of an adapter, current conductors arranged in the connection groove in the longitudinal direction thereof for supplying power by means of the adapter to the devices connected to the conductor track, and at least one signal conductor arranged in the conductor track for supplying by means of the adapter a control signal, such as a bus control signal, to the device connected to the conductor track.

The above track systems are currently used fairly commonly in various spaces for connecting lighting devices, electrical appliances and other similar devices to a power supply.

In prior art solutions it has not been possible, in general, to use device-specific control by a wired control circuit except by means of power current conductors of the track. In this case, the use of the power current conductors for supplying power is limited as regards said conductors. To build a control circuit by using a control cable is difficult or almost impossible in such a case.

To eliminate the above problems, a solution is found in which signal conductors are arranged onto the outer surface of a conductor track for supplying a control signal, such as a bus control signal, to a device, such as a lighting device, connected to the conductor track. This solution is disclosed in Finnish patent 101,758 (U.S. Pat. No 5,869,786).

The solution in accordance with Finnish patent 101,758 works well in practice. However, in certain situations esthetic values have posed a problem, i.e. in some cases persons in charge of interior design have found it difficult to accept a track solution where the signal conductors are visible, for instance. As regards electricity, the disposition of the signal conductors is a difficult electrical thing, since the power current conductors of the track easily cause interference to the signal conductors.

SUMMARY OF THE INVENTION

The object of the invention is to provide an arrangement by means of which the drawbacks of the prior art solutions can be eliminated. This is achieved with an arrangement in accordance with the invention, which is characterized in that at least one signal conductor is arranged in the connection groove of the conductor track and that a partition wall of electrically conductive material is arranged between the signal conductor and the current conductor.

The most significant advantage of the invention is that the control signal conductors can be fitted into place when manufacturing the conductor track. Changing the positions of the lamps or other devices connected to the conductor track system, or increasing or decreasing the number of the devices will not cause problems, since there are no separate signal conductors. A further advantage of the system is its simple structure, due to which the manufacturing costs are low. Yet another advantage is that the arrangement of the invention does not involve any considerable changes in the conductor track, in other words, the conductor track is still a compact integral part which is easy and quick to mount. Thus, with the arrangement of the invention, it is possible to achieve all the advantages that are achieved with the solution of Finnish patent 101,758, for instance. A further advantage of the arrangement of the invention is that the signal conductors can be mounted to be fully invisible. Yet another advantage is that, when necessary, it can be used in conjunction with the solution of Finnish patent 101,758.

BRIEF DESCRIPTION OF THE DRAWINGS

In the following the invention will be described in greater detail by means of embodiments illustrated in the accompanying drawings, in which

FIG. 1 is a perspective view of a conductor track in which an adapter is arranged. The solution of FIG. 1 is conventional technology to a person skilled in the art, and consequently FIG. 1 should only be understood as a general example of technology to which the invention relates.

DESCRIPTION OF THE PREFERRED EMBODIMENTS

Figure 1:
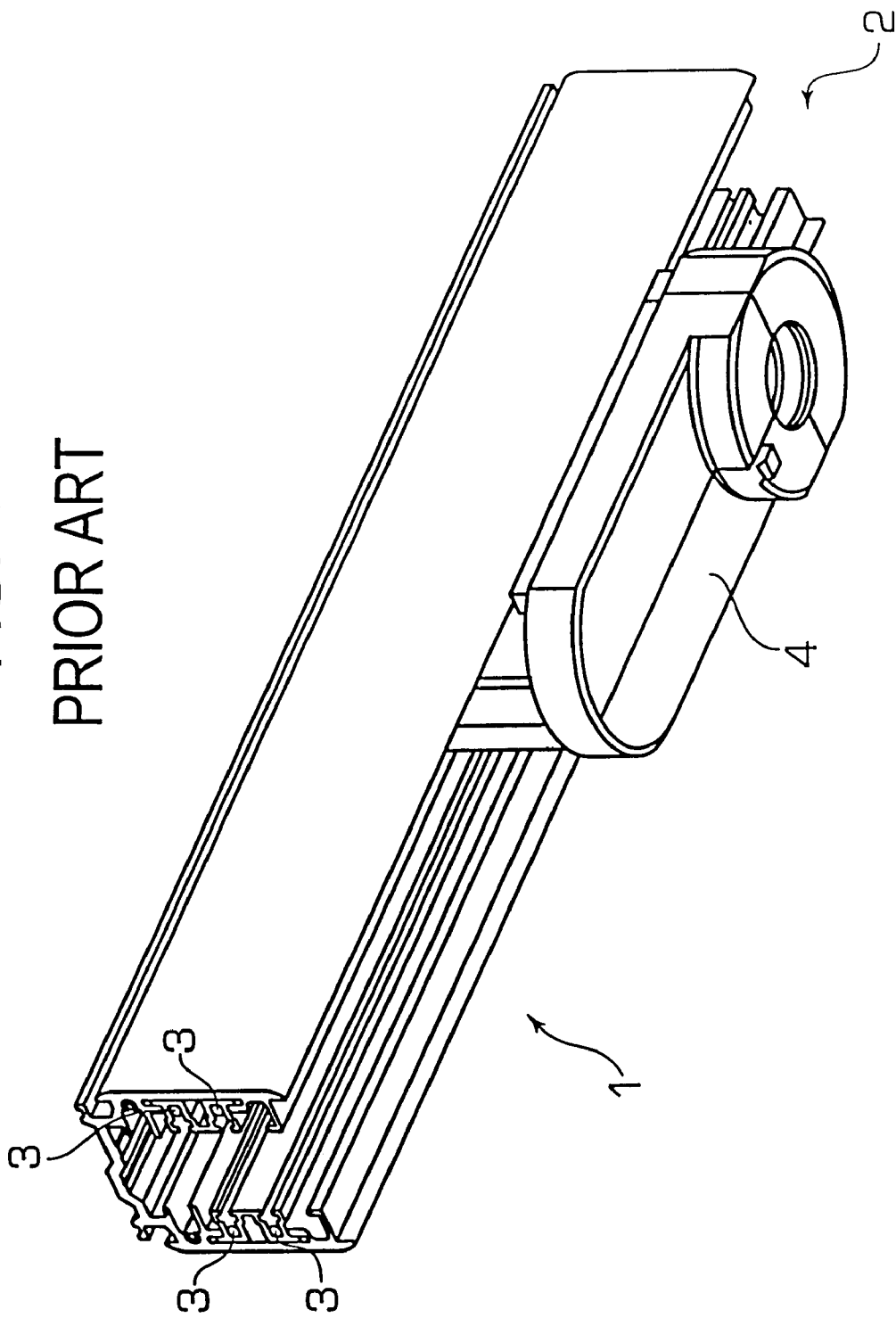
FIG. 1 is a schematic perspective view of a conductor track with an adapter arranged thereto.

The conductor track is generally indicated by reference numeral 1. The conductor track is made of aluminum profile, for instance. Reference numeral 2 indicates, in turn, a connection groove extending in the longitudinal direction of the conductor track 1. In FIG. 1, reference numeral 3 denotes current conductors arranged in the connection groove in the longitudinal direction thereof for supplying power to devices, such as lamps or other appliances, connected to the conductor track. The appliances are connected to the conductor track by means of an adapter 4.

Figure 2:
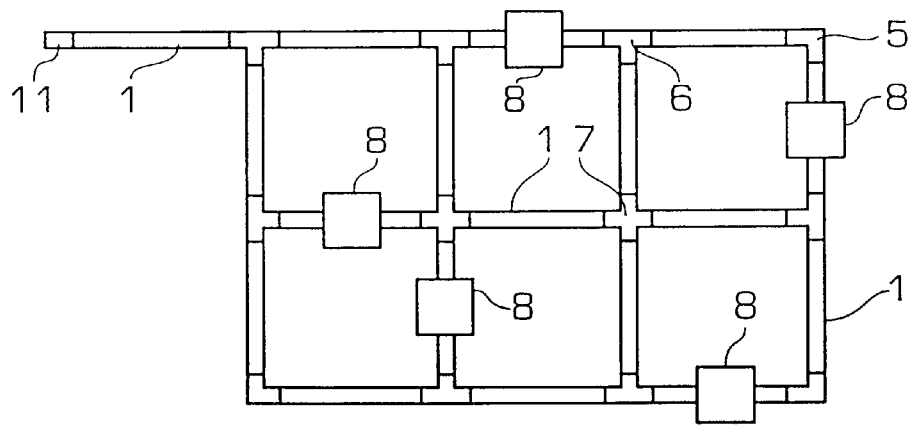
FIG. 2 is a schematic view of an exemplary track system comprising the conductor track.

FIG. 2 illustrates schematically one example of a track system comprising conductor tracks. The conductor tracks 1 are interconnected by means of various extension elements 5, 6, 7. Power is supplied to the track system through a connecting box 11. The devices, such as lamps, that are connected to the conductor track by means of adapters are schematically indicated in FIG. 2 by reference numeral 8.

The features described above are completely conventional technology to a person skilled in the art, so they will not be described more closely herein.

Figure 3:
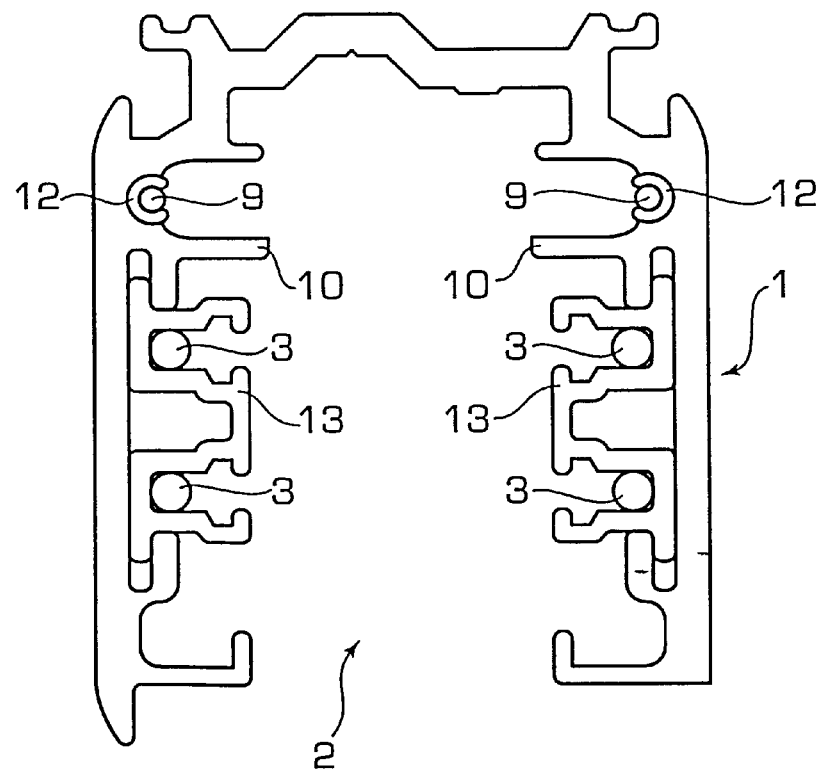
FIG. 3 is a schematic cross-sectional view of a conductor track provided with an arrangement in accordance with the invention.

FIG. 3 is a schematic cross-sectional view of a conductor track that is provided with the arrangement of the invention. In FIG. 3, the same reference numerals are employed to indicate the same parts as in FIGS. 1 and 2. A substantial feature of the invention is that at least one signal conductor 9 is arranged in the connection groove 2 of the conductor track 1 and that a partition wall 10 of electrically conductive material is arranged between the signal conductor 9 and the current conductor 3. The embodiment of FIG. 3 employs two signal conductors such that the signal conductors 9 are arranged in the vicinity of the bottom of the connection groove 2. In addition, the signal conductors 9 are placed on the interior of both walls that define the connection groove 2. The number of signal conductors may vary freely, i.e. they can be one or more. The partition wall 10 between the current conductors 3 and the signal conductors is formed to be an integral part of the conductor track 1 in the example of FIG. 3. In addition, the partition wall 10 is arranged to extend over a plane tangential to the outermost point of the current conductor surface away from the conductor track wall, whereby tolerance to interference will be improved.

In the example of FIG. 3, the signal conductors are insulated by an insulating layer 12 from the conductor track 1 and arranged to be open on the inner surface of the connection groove 2, whereby a control signal, e.g. a bus control signal, is connected to a lamp or other appliance 8 by means of the adapter 4 arranged in the connection groove 2. The current conductors are insulated from the conductor track 1 by an insulant 13. The bus control signal is connected to the control circuit of the track in the connecting box 11 or adapter 4.

Extension elements 5, 6, 7 to be used at the joints of the conductor tracks, i.e. at the joints of adjacent conductor tracks, are provided with contacts that connect the signal conductors in the groove 2 of the track 1 to one another.

Figure 4:
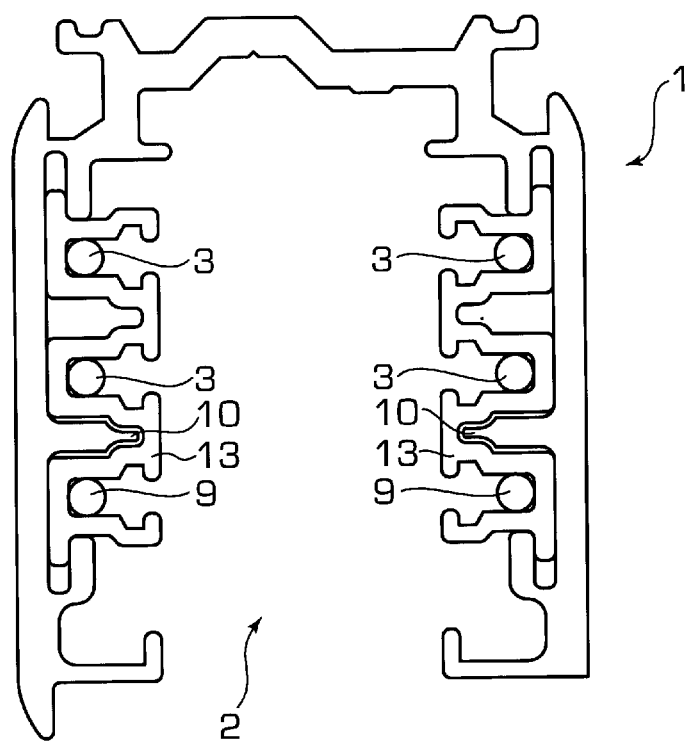
FIG. 4 is a schematic cross-sectional view of a second embodiment of a conductor track utilizing the invention.

FIG. 4 illustrates a second embodiment of the invention. In FIGS. 3 and 4 like reference numerals are employed to indicate like parts. In the example of FIG. 4, the signal conductors 9 are placed in the vicinity of the edges of the connection groove 2. Also in this embodiment, a partition wall 10 is arranged between the current conductor 3 and the signal conductor 9 to improve tolerance to interference. In this embodiment, signal conductor insulation from the conductor track 1 is implemented by means of an element used as a current conductor insulant 13.

Figure 5:
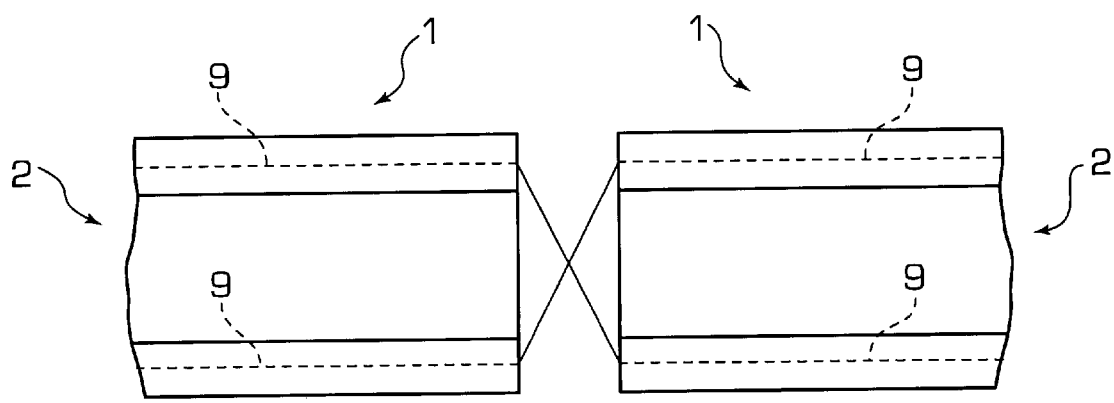
FIG. 5 is a schematic view of a track arrangement to which the invention is applied.

At the joints of the conductor tracks 1 it is possible, if necessary, to change the electrical position of the signal conductors of the control system. FIG. 5 shows a schematic view of an embodiment where two signal conductors 9 change places at a joint of the conductor tracks. The path of the signal conductors in the conductor tracks 1 is indicated schematically by broken lines. It is possible to implement the embodiment of FIG. 5, for instance, by providing the extension elements shown in FIG. 2 with any necessary cross-over arrangements. It is obvious that the example of FIG. 5 can also be applied such that all signal conductors 9 change places. It is further possible that in the embodiment of one signal conductor, for instance, said signal conductor passes from one side of the connection groove to the other side thereof, and so on.

The arrangement described above provides a solution by which lighting devices connected to the track system can be controlled to switch on and switch off or to adjust in a desired manner independently. Apart from lighting devices, other devices can naturally be used as well.

The embodiments described above are not intended to restrict the invention in any way, but the invention can be modified fully freely within the scope of the claims. It is thus obvious that the arrangement in accordance with the invention or the details thereof need not necessarily be exactly as shown in the figures, but other solutions are also possible. For instance, the number of signal conductors may vary freely as stated above. The invention is not restricted to any particular conductor track type either, but the invention can be applied in connection with any type of a conductor track. The examples of the figures employ a conductor track made of aluminum profile, whereby the partition wall can advantageously be formed to be an integral part of the conductor track. This is not the only possibility, however. It is also possible that the conductor track is made of some other material, e.g. plastic material. The partition wall can be made of any electrically conductive material, e.g. any ferromagnetic material, semi-conductive plastic material, plastic material rendered electrically conductive by blending conductive material therein, by coating it with electrically conductive material, and so on. The partition wall produced in the above described manner can be a separate part that is attached in a suitable manner to the conductor track between the signal conductor and the current conductor. The signal conductors can be placed on both inner walls or on either one of the inner walls of the connection groove and the number of the signal conductors on both of the inner walls may vary freely as desired. The invention can further be applied such that some of the signal conductors are arranged on the outer surface of the conductor track in accordance with Finnish patent 101,758 and some on the inner surface (s) of the connection groove in accordance with the invention as described above.

What is claimed is:

1. An arrangement in a conductor track, said conductor track comprising a connection groove extending in the longitudinal direction of the track for connecting a device to the conductor track by means of an adapter, current conductors arranged in the connection groove in the longitudinal direction thereof for supplying power by means of the adapter to the device connected to the conductor track, and at least one signal conductor arranged in the conductor track for supplying by means of the adapter a control signal, such as a bus control signal, to the device connected to the conductor track, said at least one signal conductor being arranged in the connection groove of the conductor track, and a partition wall of electrically conductive material being arranged between the at least one signal conductor and the current conductors.

2. An arrangement as claimed in claim 1, wherein the conductor track has a conductor track inner wall along which the at least one signal conductor and the current conductors run in the connection groove, and wherein the partition wall is arranged to extend over a plane tangential to an outermost point of a current conductor surface away from the conductor track inner wall.

3. An arrangement as claimed in claim 1, wherein the at least one signal conductor is arranged in the vicinity of a bottom of the connection groove.

4. An arrangement as claimed in claim 1, wherein the at least one signal conductor is arranged in the vicinity of an edge of the connection groove.

5. An arrangement as claimed in claim 1, wherein the partition wall is of metallic material.

6. An arrangement as claimed in claim 1, wherein the partition wall is formed to be an integral part of the conductor track.

7. An arrangement as claimed in claim 1, wherein the at least one signal conductor is insulated from the conductor track and wherein a portion of the at least one signal conductor facing an interior of the connection groove is exposed.

8. An arrangement as claimed in claim 1, wherein the conductor track has conductor track inner walls in the connection groove, and wherein the at least one signal conductor is arranged on one of the conductor track inner walls.

9. An arrangement as claimed in claim 1, further comprising at least one other signal conductor, and wherein the conductor track has opposing conductor track inner walls in the connection groove, and wherein the at least one signal conductor and the at least one other signal conductor are arranged on different conductor track inner walls.

10. An arrangement as claimed in claim 1, further comprising a plurality of conductor tracks connected by joints and further comprising at least one other signal conductor, and wherein the at least one signal conductor and the at least one other signal conductor are arranged to change places at the joints of the conductor tracks.

11. A conductor track assembly comprising:
- a conductor track having a two opposing inner walls and a bottom defining a groove,
- an adapter mounted to the conductor track for connecting a device to the conductor track,
- a current conductor mounted inside the groove to one of the two opposing inner walls of the conductor track for supplying power to the device, and
- a signal conductor, separate from the current conductor, mounted inside the groove to one of the two opposing inner walls of the conductor track, for supplying, a bus control signal to the device.

12. The conductor track assembly according to claim 11, wherein the signal conductor and the current conductor are on a same inner wall of the conductor track, and the conductor track further comprising a partition wall of electrically conductive material disposed between the signal conductor and the current conductor.

13. The conductor track assembly according to claim 12, wherein the signal conductor is formed from an electrically conductive wire insulated from the conductor track and exposed to the adapter mounted on the conductor track.

14. The conductor track assembly according to claim 12, wherein the partition wall extends in the groove beyond the signal conductor.

15. The conductor track assembly according to claim 12, wherein the signal conductor is in the vicinity of the bottom of the groove.

16. The conductor track assembly according to claim 12, further comprising a second signal conductor, and wherein the signal conductor and the second signal conductor are on different inner walls of the conductor track.

17. The conductor track assembly according to claim 12, further comprising a plurality of conductor tracks connected by joints and further comprising a second signal conductor, and wherein the signal conductor and the second signal conductor change places at the joints of the conductor tracks.

18. The conductor track assembly according to claim 12, wherein the conductor track is made from a non-conductive material.

\* \* \* \* \*